United States Patent Office 3,143,576
Patented Aug. 4, 1964

3,143,576
PROCESS FOR MAKING TETRABROMO-
HYDROQUINONE
Joseph E. Kovacic, Midland, Mich., assignor to The Dow
Chemical Company, Midland, Mich., a corporation of
Delaware
No Drawing. Filed Aug. 30, 1962, Ser. No. 220,548
5 Claims. (Cl. 260—623)

This invention relates to a new process for making tetrabromohydroquinone by a single stage bromination.

The chemical literature shows no simple and direct method for making this compound. Known procedures involve multi-step processes which often include inefficient use of the expensive bromine reactant. Such methods include, for example, the reaction in acetic acid of hydrogen bromide with tetrabromo-p-benzoquinone, commonly known as bromanil. Another known process involves a sequence of steps wherein p-benzoquinone is reacted with hydrogen bromide to make monobromohydroquinone which is then oxidized to monobromo-p-benzoquinone and this cycle of reactions is repeated until tetrabromohydroquinone is obtained.

Direct bromination of hydroquinone in the past has produced either bromanil or complex mixtures from which separation of any pure compound is difficult. For example, when hydroquinone is reacted with bromine in acetic acid or in methanol, bromanil rather than tetrabromohydroquinone is the product obtained. When a solvent such as chloroform, carbon tetrachloride, or water is used for this bromination, insoluble lower brominated hydroquinones separate from the reaction solution and agglomerate into an unstirrable mass, thus effectively halting the progress of the reaction. In addition, oxidation often occurs and quinones are produced.

It has now been found that hydroquinone can be brominated directly to obtain good yields of essentially pure tetrabromohydroquinone by carrying out the reaction in a mixed solvent consisting of about two to about fifteen parts by volume of an inert normally liquid chlorinated hydrocarbon and one part of methanol. A solvent of this composition has been found to have the capability of holding in solution the bromine and the mono, di, and tribrominated hydroquinones to a sufficient extent to permit the bromination to continue to the tetrabromohydroquinone stage. It has also been found that in such a system, the oxidation of tetrabromohydroquinone to bromanil is held to a minimum under proper operating conditions and the desired product is separable from the reaction mixture in good yield and in substantially pure state.

Chlorinated hydrocarbons suitable for use in the process include both aliphatic and aromatic compounds of the benzene series which are inert under reaction conditions such as chloroform, carbon tetrachloride, methylchloroform, perchloroethylene, propylene dichloride, chlorobenzene, o-dichlorobenzene, and similar chlorinated solvents. Chloroform is particularly advantageous and is a preferred solvent. Methylchloroform (1,1,1-trichloroethane) also gives good results. Solvent compositions containing from about two to about fifteen volumes of chlorinated hydrocarbon to one volume of methanol are operable in the process. Lower proportions of chlorinated hydrocarbon favor the production of bromanil at a rapidly increasing rate while higher proportions are unsuitable because of lowered capacity to dissolve the intermediate brominated hydroquinones and increasing difficulty in completing the bromination reaction. Proportions of from three to about five volumes of chlorinated hydrocarbon to one of methanol are preferred.

Aliphatic alcohols other than methanol are not satisfactory as solvent components because of their tendency to react with bromine. Completion of the bromination to obtain a reasonable yield of good quality tetrabromohydroquinone becomes impractically difficult and the formation of byproducts complicates the product separation procedure.

For convenience in handling the reaction mixture, about 1–2.5 liters of solvent per gram mole of hydroquinone are best employed. Usually 1.2–2 liters per gram mole produces a manageable product slurry with minimal loss through solubility.

Bromine is preferably used in approximately the stoichiometric proportion of four moles per mole of hydroquinone to avoid both underbromination and oxidation of the product to bromanil. In practice, a small excess of bromine, that is, about 4.0–4.1 moles is usually employed to compensate for small losses and ensure complete bromination.

The reaction is best carried out at a temperature between about 0° C. and the reflux temperature of the reaction mixture. Moderate superatmospheric pressure may be employed to obtain somewhat higher reaction temperatures if desired. Ordinarily the process is carried out by adding bromine to the hydroquinone solution at about or slightly above room temperature, then heating the reaction mixture at a somewhat higher temperature, usually the boiling point of the solution, until the bromine is essentially all reacted. The reaction mixture is then filtered to separate the precipitated tetrabromohydroquinone, the bulk of any bromanil which may have formed remaining in solution. Depending upon the particular solvent composition and volume used, the product may be separated hot or the mixture may be cooled somewhat to obtain a better yield.

It has been found particularly advantageous to operate this process in a semi-continuous manner wherein the mother liquor remaining from the product separation is reused as reaction solvent. Preferably, the original volume is maintained by addition of fresh solvent to replace handling losses. In this way, production of unwanted bromanil is minimized and hydroquinone can be converted nearly quantitatively to essentially pure tetrabromohydroquinone.

The following examples illustrate various modes in which the invention may be applied within the conditions as specified.

*Example 1*

In a one liter reaction flask equipped with dropping funnel, stirrer, thermometer, and reflux condenser, 160 g. of liquid bromine was added dropwise over a period of 1.5 hrs. to a solution of 27.5 g. of hydroquinone in a mixed solvent consisting of 300 ml. of chloroform and 75 ml. of methanol at a temperature of 25–40° C. The reaction mixture was then heated for one hour at reflux temperature, cooled to about room temperature, and filtered to obtain the precipitated crystalline product. After drying, the product was identified by melting point and infrared examination as substantially pure tetrabromohydroquinone. It amounted to 80 g., a yield of 75% based on the starting hydroquinone.

*Example 2*

By the procedure of Example 1, 0.8 g. mole of bromine was reacted with 0.2 g. mole of hydroquinone in a solvent consisting of 257 ml. of chloroform and 51 ml. of methanol. Substantially pure tetrabromohydroquinone was obtained in 84.5% yield.

*Example 3*

As shown in Example 1, 0.8 g. mole of bromine was reacted with 0.2 g. mole of hydroquinone in a solvent consisting of 277 ml. of chloroform and 31 ml. of methanol.

An 86% yield of tetrabromohydroquinone contaminated with lower brominated hydroquinones was obtained.

*Example 4*

As shown in the foregoing examples, 0.8 g. mole of bromine and 0.2 g. mole of hydroquinone were reacted in a solvent mixture of 154 ml. each of chloroform and methanol. The major product of the reaction was bromanil, obtained in 60.5% yield. The remainder of the recovered material was mixed brominated hydroquinone.

Example 5 illustrates a semi-continuous mode of operation whereby essentially all of the hydroquinone can be converted to tetrabromohydroquinone and recovered as such.

*Example 5*

In a reactor flask similar to that used in Example 1, 0.8 g. mole of bromine was added in about 25 minutes to a solution of 0.2 g. mole of hydroquinone in a mixture of 240 ml. of chloroform and 68 ml. of methanol at 25–30° C. The reaction mixture was then heated to reflux temperature until there was no further lightening of color. The mixture was filtered hot to obtain 68.9 g. of tetrabromohydroquinone, a yield of 81% based on the starting hydroquinone. The volume of filtrate was brought up to 300 ml. by addition of 40 ml. of a 3.5/1 by volume mixture of chloroform and methanol. Another 0.2 g. mole of hydroquinone was then added to the filtrate and the bromination and heating procedures were repeated as above. Filtration of the hot reaction mixture yielded an essentially theoretical quantity of tetrabromohydroquinone. The cycle of operation was repeated twice more. The overall yield of essentially pure tetrabromohydroquinone for the four cycles was 92.4% based on the total hydroquinone used.

Examples 6–11 show in tabular form the results obtained by brominating hydroquinone in other solvents using a procedure similar to that shown in the examples above. The solvents were mixtures of 3.5 parts by volume of chlorinated hydrocarbon to one part of alcohol and were employed in amounts corresponding to 1.5 liters to one gram mole of hydroquinone. The purity of each product was determined from its infrared spectrum as a mull in purified heavy mineral oil as compared to that of a highly purified sample.

*Examples 6–11*

| Solvent System | Percent Yield Tetrabromohydroquinone | Purity of Product |
|---|---|---|
| Propylene Dichloride methanol | 86 | ca. 92%.[1] |
| Methylchloroform Methanol | 84.5 | ca. 95%.[1] |
| CCl₄ Methanol | 97 | ca. 89%.[2] |
| Chlorobenzene Methanol | 58.4 | ca. 93%.[1] |
| Chloroform Ethyl Alcohol | [3] 81.6 | ca. 86%.[3] |
| Chloroform Isopropyl Alcohol | [3] 64.8 | ca. 82%.[3] |

[1] Major impurity was bromanil.
[2] Contained some bromanil and lower brominated hydroquinones.
[3] Mixture of brominated hydroquinones.

I claim:
1. A process for making tetrabromohydroquinone which comprises reacting by contacting about four moles of bromine with one mole of hydroquinone dissolved in about one to about 2.5 liters per gram mole of hydroquinone of a mixed solvent consisting of about 2 to about 15 parts by volume of a normally liquid inert chlorinated hydrocarbon and one part of methanol.

2. The process of claim 1 wherein the chlorinated hydrocarbon is chloroform.

3. The process of claim 1 wherein the chlorinated hydrocarbon is methylchloroform.

4. A process for making tetrabromohydroquinone which comprises reacting by contacting about four moles of bromine with one mole of hydroquinone dissolved in about 1.2 to about 2 liters per gram mole of hydroquinone of a mixed solvent consisting of about 3 to about 5 parts by volume of chloroform and one part of methanol.

5. The process of claim 4 wherein the tetrabromohydroquinone product is separated from the reaction mixture thereby obtained and the remaining portion of the reaction mixture is recycled to the process.

References Cited in the file of this patent
UNITED STATES PATENTS
1,912,744    Von Bramer et al. _____ June 6, 1933
FOREIGN PATENTS
1,060,371    France _____ Nov. 18, 1953
OTHER REFERENCES
Sarauw: Ann., 209:122-125 (1881).